US010721285B2

(12) United States Patent
Braness et al.

(10) Patent No.: US 10,721,285 B2
(45) Date of Patent: Jul. 21, 2020

(54) SYSTEMS AND METHODS FOR QUICK START-UP OF PLAYBACK

(71) Applicant: DIVX, LLC, San Diego, CA (US)

(72) Inventors: Jason Braness, San Diego, CA (US); William David Amidei, San Diego, CA (US); Cristina Dobrin, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

(21) Appl. No.: 16/101,339

(22) Filed: Aug. 10, 2018

(65) Prior Publication Data

US 2019/0044995 A1     Feb. 7, 2019

Related U.S. Application Data

(63) Continuation of application No. 15/085,598, filed on Mar. 30, 2016, now Pat. No. 10,075,292.

(51) Int. Cl.
   *G06F 21/10*     (2013.01)
   *H04L 29/08*     (2006.01)
   (Continued)

(52) U.S. Cl.
   CPC .......... *H04L 67/02* (2013.01); *H04L 63/0428* (2013.01); *H04L 63/062* (2013.01);
   (Continued)

(58) Field of Classification Search
   None
   See application file for complete search history.

(56) References Cited

U.S. PATENT DOCUMENTS 5,361,332 A   11/1994   Yoshida et al.
5,404,436 A    4/1995   Hamilton
              (Continued)

FOREIGN PATENT DOCUMENTS

CN   109154930 A    1/2019
EP       813167 A2  12/1997
              (Continued)

OTHER PUBLICATIONS

"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pgs.
(Continued)

*Primary Examiner* — Brandon S Hoffman
(74) *Attorney, Agent, or Firm* — KPPB LLP (57) ABSTRACT

Systems and methods for quick start-up of playback in accordance with embodiments of the invention are disclosed. Media content may be encoded in a plurality of alternative streams and a quick start-up stream. The quick start-up stream may include media content that is encoded at a lower quality that the alternative streams and may be encrypted with a different, less secure encryption process than that of the alternative streams. During a start-up of playback, the playback device streams the media content from a quick start-up stream until a metric, such as a decryption key for the alternative streams is met. The device then streams the media content from the alternative streams in response to the metric being met.

20 Claims, 6 Drawing Sheets

(51) Int. Cl.
*H04L 29/06* (2006.01)
*H04N 21/254* (2011.01)
*H04N 21/2343* (2011.01)
*H04N 21/643* (2011.01)
*H04N 21/845* (2011.01)
*H04N 21/6334* (2011.01)
*H04N 21/4402* (2011.01)
*H04N 21/2347* (2011.01)
*H04N 21/462* (2011.01)

(52) U.S. Cl.
CPC ...... *H04L 65/4084* (2013.01); *H04L 65/4092* (2013.01); *H04L 65/601* (2013.01); *H04L 65/602* (2013.01); *H04L 65/607* (2013.01); *H04N 21/2347* (2013.01); *H04N 21/23439* (2013.01); *H04N 21/2541* (2013.01); *H04N 21/44029* (2013.01); *H04N 21/4621* (2013.01); *H04N 21/63345* (2013.01); *H04N 21/64322* (2013.01); *H04N 21/8456* (2013.01); *H04L 2209/60* (2013.01)

(56) References Cited

U.S. PATENT DOCUMENTS

| | | |
|---|---|---|
| 5,589,993 A | 12/1996 | Naimpally et al. |
| 5,715,403 A | 2/1998 | Stefik |
| 5,717,816 A | 2/1998 | Boyce et al. |
| 6,031,622 A | 2/2000 | Ristow et al. |
| 6,038,257 A | 3/2000 | Brusewitz et al. |
| 6,141,754 A | 10/2000 | Choy |
| 6,155,840 A | 12/2000 | Sallette |
| 6,195,388 B1 | 2/2001 | Choi et al. |
| 6,658,056 B1 | 12/2003 | Duruöz et al. |
| 6,771,703 B1 | 8/2004 | Oguz et al. |
| 6,807,306 B1 | 10/2004 | Girgensohn et al. |
| 6,850,252 B1 | 2/2005 | Hoffberg |
| 6,859,496 B1 | 2/2005 | Boroczky et al. |
| 6,956,901 B2 | 10/2005 | Boroczky et al. |
| 7,023,924 B1 | 4/2006 | Keller et al. |
| 7,197,234 B1 | 3/2007 | Chatterton |
| 7,242,772 B1 | 7/2007 | Tehranchi |
| 7,421,411 B2 | 9/2008 | Kontio et al. |
| 7,478,325 B2 | 1/2009 | Foehr |
| 7,689,510 B2 | 3/2010 | Lamkin et al. |
| 7,779,097 B2 | 8/2010 | Lamkin et al. |
| 7,974,714 B2 | 7/2011 | Hoffberg |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,069,260 B2 | 11/2011 | Speicher et al. |
| 8,225,061 B2 | 7/2012 | Greenebaum |
| 8,233,768 B2 | 7/2012 | Soroushian et al. |
| 8,249,168 B2 | 8/2012 | Graves |
| 8,270,473 B2 | 9/2012 | Chen et al. |
| 8,270,819 B2 | 9/2012 | Vannier |
| 8,289,338 B2 | 10/2012 | Priyadarshi et al. |
| 8,291,460 B1 | 10/2012 | Peacock |
| 8,311,115 B2 | 11/2012 | Gu et al. |
| 8,321,556 B1 | 11/2012 | Chatterjee et al. |
| 8,386,621 B2 | 2/2013 | Park |
| 8,412,841 B1 | 4/2013 | Swaminathan et al. |
| 8,456,380 B2 | 6/2013 | Pagan |
| 8,472,792 B2 | 6/2013 | Butt |
| 8,515,265 B2 | 8/2013 | Kwon et al. |
| 8,516,529 B2 | 8/2013 | Lajoie et al. |
| 8,606,069 B2 | 12/2013 | Okubo et al. |
| 8,681,866 B1 | 3/2014 | Jia |
| 8,774,609 B2 | 7/2014 | Drake et al. |
| 8,806,188 B2 | 8/2014 | Braness et al. |
| 8,832,297 B2 | 9/2014 | Soroushian et al. |
| 8,843,586 B2 | 9/2014 | Pantos et al. |
| 8,909,922 B2 | 12/2014 | Kiefer et al. |
| 8,914,534 B2 | 12/2014 | Braness et al. |
| 8,918,908 B2 | 12/2014 | Ziskind et al. |
| 8,997,254 B2 | 3/2015 | Amidei et al. |
| 9,197,685 B2 | 11/2015 | Soroushian |
| 10,075,292 B2 | 9/2018 | Amidei et al. |
| 2002/0057898 A1 | 5/2002 | Normile |
| 2002/0191959 A1 | 12/2002 | Lin et al. |
| 2003/0002578 A1 | 1/2003 | Tsukagoshi et al. |
| 2003/0005139 A1 | 1/2003 | Colville et al. |
| 2003/0065777 A1 | 4/2003 | Mattila et al. |
| 2003/0152370 A1 | 8/2003 | Otomo et al. |
| 2003/0163824 A1 | 8/2003 | Gordon et al. |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0024688 A1 | 2/2004 | Bi et al. |
| 2004/0039916 A1 | 2/2004 | Aldis et al. |
| 2004/0081434 A1 | 4/2004 | Jung et al. |
| 2004/0136698 A1 | 7/2004 | Mock |
| 2004/0158878 A1 | 8/2004 | Ratnakar et al. |
| 2004/0268400 A1 | 12/2004 | Barde et al. |
| 2005/0038826 A1 | 2/2005 | Bae et al. |
| 2005/0114896 A1 | 5/2005 | Hug |
| 2005/0149450 A1 | 7/2005 | Stefik et al. |
| 2005/0193070 A1 | 9/2005 | Brown et al. |
| 2005/0193322 A1 | 9/2005 | Lamkin et al. |
| 2005/0198681 A1 | 9/2005 | Park et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0002425 A1 | 1/2006 | Mane et al. |
| 2006/0031564 A1 | 2/2006 | Brassil et al. |
| 2006/0078301 A1 | 4/2006 | Ikeda et al. |
| 2006/0129909 A1 | 6/2006 | Butt et al. |
| 2006/0173887 A1 | 8/2006 | Breitfeld et al. |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2007/0031110 A1 | 2/2007 | Rijckaert |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0180125 A1 | 8/2007 | Knowles et al. |
| 2007/0185982 A1 | 8/2007 | Nakanowatari et al. |
| 2007/0239839 A1 | 10/2007 | Buday et al. |
| 2007/0274679 A1 | 11/2007 | Yahata et al. |
| 2007/0292107 A1 | 12/2007 | Yahata et al. |
| 2008/0043832 A1 | 2/2008 | Barkley et al. |
| 2008/0066181 A1 | 3/2008 | Haveson et al. |
| 2008/0101466 A1 | 5/2008 | Swenson et al. |
| 2008/0120389 A1 | 5/2008 | Bassali et al. |
| 2008/0126248 A1 | 5/2008 | Lee et al. |
| 2008/0137736 A1 | 6/2008 | Richardson et al. |
| 2008/0172441 A1 | 7/2008 | Speicher et al. |
| 2008/0192818 A1 | 8/2008 | DiPietro et al. |
| 2008/0195744 A1 | 8/2008 | Bowra et al. |
| 2008/0205860 A1 | 8/2008 | Holtman |
| 2008/0222302 A1 | 9/2008 | Nguyen et al. |
| 2008/0256105 A1 | 10/2008 | Nogawa et al. |
| 2008/0263354 A1 | 10/2008 | Beuque et al. |
| 2008/0279535 A1 | 11/2008 | Haque et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |

(56) References Cited

U.S. PATENT DOCUMENTS

| | | |
|---|---|---|
| 2009/0060452 A1 | 3/2009 | Chaudhri |
| 2009/0066839 A1 | 3/2009 | Jung et al. |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0169181 A1 | 7/2009 | Priyadarshi et al. |
| 2009/0201988 A1 | 8/2009 | Gazier et al. |
| 2009/0226148 A1 | 9/2009 | Nesvadba et al. |
| 2009/0228395 A1 | 9/2009 | Wegner et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2010/0040351 A1 | 2/2010 | Toma et al. |
| 2010/0074324 A1 | 3/2010 | Qian et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0111192 A1 | 5/2010 | Graves |
| 2010/0118978 A1 | 5/2010 | Rodriguez et al. |
| 2010/0138903 A1 | 6/2010 | Medvinsky |
| 2010/0158109 A1 | 6/2010 | Dahlby et al. |
| 2010/0161825 A1 | 6/2010 | Ronca et al. |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2010/0290761 A1 | 11/2010 | Drake et al. |
| 2010/0306373 A1 | 12/2010 | Wormley |
| 2010/0313225 A1 | 12/2010 | Cholas et al. |
| 2010/0313226 A1 | 12/2010 | Cholas et al. |
| 2010/0319014 A1 | 12/2010 | Lockett et al. |
| 2011/0047209 A1 | 2/2011 | Lindholm et al. |
| 2011/0066673 A1 | 3/2011 | Outlaw |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0107379 A1 | 5/2011 | Lajoie et al. |
| 2011/0126191 A1 | 5/2011 | Hughes et al. |
| 2011/0129011 A1 | 6/2011 | Cilli et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0191803 A1 | 8/2011 | Baldwin et al. |
| 2011/0197237 A1 | 8/2011 | Turner |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0233345 A1 | 9/2012 | Hannuksela |
| 2012/0254455 A1 | 10/2012 | Adimatyam et al. |
| 2012/0265562 A1 | 10/2012 | Daouk et al. |
| 2012/0278496 A1 | 11/2012 | Hsu |
| 2012/0278497 A1 | 11/2012 | Hsu et al. |
| 2012/0294355 A1 | 11/2012 | Holcomb et al. |
| 2012/0307883 A1 | 12/2012 | Graves |
| 2012/0311094 A1 | 12/2012 | Biderman et al. |
| 2012/0314778 A1 | 12/2012 | Salustri et al. |
| 2012/0331167 A1 | 12/2012 | Hunt |
| 2013/0007200 A1 | 1/2013 | van der Schaar et al. |
| 2013/0044821 A1 | 2/2013 | Braness et al. |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0166765 A1 | 6/2013 | Kaufman |
| 2013/0166906 A1 | 6/2013 | Swaminathan et al. |
| 2013/0179199 A1 | 7/2013 | Ziskind et al. |
| 2013/0179992 A1 | 7/2013 | Ziskind et al. |
| 2013/0226578 A1 | 8/2013 | Bolton et al. |
| 2013/0226635 A1 | 8/2013 | Fisher |
| 2013/0311670 A1 | 11/2013 | Tarbox et al. |
| 2013/0329781 A1 | 12/2013 | Su et al. |
| 2014/0003516 A1* | 1/2014 | Soroushian ........ H04N 21/2387 375/240.13 |
| 2014/0003951 A1 | 1/2014 | Soroushian |
| 2014/0096269 A1* | 4/2014 | Amidei ............... H04L 63/0435 726/29 |
| 2014/0101722 A1 | 4/2014 | Moore |
| 2014/0189065 A1 | 7/2014 | van der Schaar et al. |
| 2014/0241420 A1 | 8/2014 | Orton-jay et al. |
| 2014/0241421 A1 | 8/2014 | Orton-jay et al. |
| 2014/0250473 A1 | 9/2014 | Braness et al. |
| 2014/0307804 A1 | 10/2014 | Rodriguez et al. |
| 2017/0288865 A1 | 10/2017 | Amidei et al. |

FOREIGN PATENT DOCUMENTS

| | | |
|---|---|---|
| EP | 1056273 A2 | 11/2000 |
| EP | 2735116 A2 | 5/2014 |
| EP | 3436964 A1 | 2/2019 |
| HK | 1259659 A | 12/2019 |
| JP | 2019513337 A | 5/2019 |
| WO | 2004102571 A1 | 11/2004 |
| WO | 2009065137 A1 | 5/2009 |
| WO | 2010060106 A1 | 5/2010 |
| WO | 2010122447 A1 | 10/2010 |
| WO | 2011103364 A1 | 8/2011 |
| WO | 2012094171 A1 | 7/2012 |
| WO | 20120094181 A2 | 7/2012 |
| WO | 20120094189 A1 | 7/2012 |
| WO | 2012177872 A2 | 12/2012 |
| WO | 2012177872 A3 | 12/2012 |
| WO | 2013103986 A2 | 7/2013 |
| WO | 2017172352 A1 | 10/2017 |

OTHER PUBLICATIONS

European Search Report for Application 11855103.5, search completed Jun. 26, 2014, 10 pgs.
European Search Report for Application 11855237.1, search completed Jun. 12, 2014, 9 pgs.
Federal Computer Week, "Tool Speeds Info to Vehicles", Jul. 25, 1999, 5 pgs.
HTTP Live Streaming Overview, Networking & Internet, Apple, Inc., Apr. 1, 2011, 38 pgs.
InformationWeek, "Internet on Wheels", InformationWeek: Front End: Daily Dose, Jul. 20, 1999, Printed on Mar. 26, 2014, 3 pgs.
International Preliminary Report on Patentability for International Application PCT/US2013/043181, dated Dec. 31, 2014, dated Jan. 8, 2015, 11 pgs.
International Preliminary Report on Patentability for International Application PCT/US2017/022348, Report dated Oct. 2, 2018, dated Oct. 11, 2018, 9 pgs.

(56) References Cited

OTHER PUBLICATIONS

International Search Report and Written Opinion for International Application No. PCT/US2013/043181, completed Nov. 27, 2013, dated Dec. 6, 2013, 12 pgs.
International Search Report and Written Opinion for International Application No. PCT/US2017/022348, completed May 4, 2017, dated Jun. 1, 2017, 15 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for PCT/US2013/020572, International Filing Date Jan. 7, 2013, Search Completed Mar. 19, 2013, dated Apr. 29, 2013, 10 pgs.
ITS International, "Fleet System Opts for Mobile Server", Aug. 26, 1999, Printed on Oct. 21, 2011 from http://www.itsinternational.com/News/article.cfm?recordID=547, 1 page.
Microsoft Media Platform: Player Framework, "Microsoft Media Platform: Player Framework v2.5 (formerly Silverlight Media Framework)", May 3, 2011, 2 pgs.
Microsoft Media Platform: Player Framework, "Silverlight Media Framework v1.1", Jan. 2010, 2 pgs.
"Adaptive Streaming Comparison", Jan. 28, 2010, 5 pgs.
"Best Practices for Multi-Device Transcoding", Kaltura Open Source Video, Printed on Nov. 27, 2013 from knowledge.kaltura.com/best-practices-multi-device-transcoding, 13 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for...-a018239381, 6 pgs.
"MPEG-2, Part 1, ISO/IEC 13818-1", Information technology—Generic Coding of Moving Pictures and Associated Audio: Systems, Nov. 13, 1994, 162 pgs.
"MPEG-4, Part 14, ISO/IEC 14496-14", Information technology—Coding of audio-visual objects, Nov. 15, 2003, 18 pgs.
"Netflix turns on subtitles for PC, Mac streaming", Yahoo! News, Apr. 21, 2010, Printed on Mar. 26, 2014, 3 pgs.
"Smooth Streaming Client", The Official Microsoft IIS Site, Sep. 24, 2010, 4 pgs.
"Supported Media Formats", Supported Media Formats, Android Developers, Printed on Nov. 27, 2013 from developer.android.com/guide/appendix/media-formats.html, 3 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
U.S. Appl. No. 13/224,298, "Final Office Action Received", dated May 19, 2014, 27 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, 9 pgs.
Author Unknown, "Tunneling QuickTime RTSP and RTP over HTTP", Published by Apple Computer, Inc.: 1999 (month unknown), 6 pgs.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Fielding et al., "Hypertext Transfer Protocol—HTTP1.1", Network Working Group, RFC 2616, Jun. 1999, 60 pgs (presented in two parts).
Fielding et al., "Hypertext Transfer Protocol—HTTP1.1", Network Working Group, RFC 2616, Jun. 1999, 54 pgs (presented in two parts).
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 2010, 15 pgs.
Inlet Technologies, "Adaptive Delivery to iDevices", 2010, 2 pgs.
Inlet Technologies, "Adaptive delivery to iPhone 3.0", 2009, 2 pgs.
Inlet Technologies, "HTTP versus RTMP", 2009, 3 pgs.
Inlet Technologies, "The World's First Live Smooth Streaming Event: The French Open", 2009, 2 pgs.
Kim, Kyuheon "MPEG-2 ES/PES/TS/PSI", Kyung-Hee University, Oct. 4, 2010, 66 pgs.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.
MSDN, "Adaptive streaming, Expression Studio 2.0", Apr. 23, 2009, 2 pgs.
Nelson, "Smooth Streaming Deployment Guide", Microsoft Expression Encoder, Aug. 2010, 66 pgs.
Nelson, Michael "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pgs.
Noe, A. "Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, 51 pgs.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html, 7 pgs.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R "HTTP Live Streaming: draft-pantos-http-live-streaming-06", Published by the Internet Engineering Task Force (IETF), Mar. 31, 2011, 24 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H "Real Time Streaming Protocol 2.0 (RTSP): draft-ietfmmusic-rfc2326bis-27", Mmusic Working Group of the Internet Engineering Task Force (IETF), 296 pgs. (presented in two parts), Mar. 9, 2011, 296 pages.
Schulzrinne et al., "Real Time Streaming Protocol (RTSP)", Internet Engineering Task Force, RFC 2326, Apr. 1998, 80 pgs.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Wu, Feng et al., "Next Generation Mobile Multimedia Communications: Media Codec and Media Transport Perspectives", in China Communications, Oct. 2006, 15 pgs.

(56) References Cited

OTHER PUBLICATIONS

Zambelli, "IIS Smooth Streaming Technical Overview", Microsoft Corporation, Mar. 2009, 17 pgs.
Extended European Search Report for European Application No. 17776285.3, Search completed Jan. 31, 2019, dated Feb. 12, 2019, 9 pgs.

* cited by examiner

SYSTEMS AND METHODS FOR QUICK START-UP OF PLAYBACK

CROSS-REFERENCE TO RELATED APPLICATIONS

The current application claims priority as a continuation of U.S. patent application Ser. No. 15/085,598 filed Mar. 30, 2016 and now issued as U.S. Pat. No. 10,075,292, entitled "Systems and Methods for Quick Start-Up of Playback", the disclosure of which is incorporated by reference herein in its entirety.

FIELD OF THE INVENTION

The present invention generally relates to adaptive streaming and more specifically to streaming systems that include a quick start-up stream for use in beginning playback of media content.

BACKGROUND

The term streaming media describes the playback of media on a playback device, where the media is stored on one or more servers and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e. is based upon the Matroska container format, but includes elements that are not specified within the Matroska format).

To provide a consistent means for the delivery of media content over the Internet, the International Organization for Standardization (ISO) and the International Electrotechnical Commission (IEC) have put for the Dynamic Adaptive Streaming over HTTP (DASH) standard. The DASH standard specifies formats for the media content and the description of the content for delivery of MPEG content using HTTP. In accordance with DASH, each component of media content for a presentation is stored in one or more streams. Each of the streams is divided into segments. A Media Presentation Description (MPD) is a data structure that includes information about the segments in each of the stream and other information needed to present the media content during playback. A playback device uses the MPD to obtain the components of the media content using adaptive bit rate streaming for playback.

Often, content providers encrypt the data in the streams of media content to protect against unauthorized users accessing and using the media content. Thus, prior to playback, a playback device has to interact with an authentication system to obtain a key that may be used to decrypt the data from the streams. This process of obtaining the key often involves a negotiation process that takes time to complete. As such, the playback device cannot decrypt and playback the media content from a stream until the key is obtained by completing the negotiation process. In some cases, this may delay playback for an unacceptable amount of time.

SUMMARY OF THE INVENTION

Systems and methods for quick start-up of video playback in accordance with embodiments of the invention are disclosed. A process for providing a quick start-up of video playback in accordance with at least some embodiments of the invention is performed in the following manner. A playback device receives information for various of alternative streams of the media content and a quick start-up stream of media content from a content provider system over a network. The media content in the alternative streams is encoded at various bitrates, resolutions, and frame rates and the content in each particular alternative stream has a particular quality based upon at least one of the bitrate, resolution, and frame rate of the particular stream. The quality of media content in the quick start-up stream has a lesser quality than the video content of each of the alternative streams. The playback device commences streaming of the media content in the quick start-up stream from the content provider system over the network. The playback devices determines when a metric has been met by the streaming. In response to the metric being met, the playback device commences streaming of the media content from one of the alternative streams from the content provider system over the network.

In accordance with some embodiments, the alternative streams are encrypted using a first encryption process. In accordance with some of these embodiments the playback device requests a decryption key for the first encryption process from an authentication system over the network in response to receiving the information for the alternative streams. The playback device receives the decryption key for the first encryption process from the authentication system in response to requesting the decryption key and determines that the metric has been met in response to the playback device receiving the decryption key. In accordance with a number of embodiments, the quick start-up stream is encrypted using a second encryption process that is less secure than the first encryption process and the playback device obtains a decryption key for the second encryption process in response to receiving the information for the quick start-up stream using the playback device. The playback device then decodes the media content from the quick start-up stream with the second decryption key in response to receiving the media content in the quick start-up stream. In accordance with a number of embodiments, the second decryption key is read from the information received for the quick start-up stream by the playback device.

In accordance with many embodiments, the playback device obtains the second decryption in the following manner. The playback device reads decryption information for the second encryption process from the information received for the quick start-up key and requests the decryption key from the second encryption process from a content provider system over the network. The decryption key for the second decryption process is then received from the content provider system by the playback device.

In accordance with some embodiments, the playback device determines that the metric is met by determining either that at least one of a specified amount of video content is received using the quick start-up stream or a certain amount of time has elapsed.

In accordance with some embodiments, the playback device determines a specific portion of the media content is a start position for playback of the media content using the playback device and commences streaming the media content from the determined specific portion in the quick start-up stream.

DETAILED DESCRIPTION

Turning now to the drawings, systems and methods for quick start-up of the playback of media content in an adaptive bitrate streaming system in accordance with some embodiments of the invention are illustrated. Start-up occurs when the next frame to be played back is not already stored within the buffer of the playback device. Start-up can occur, when a video is started for the first time or when playback is resumed after a non-sequential playback operation is performed, such as a chapter seek or time seek. Thus, a delay in buffering or loading of new media content (to reduce the likelihood of buffer underflow when playback commences) may result in a delay in displaying the new media content. In accordance with some embodiments, start-up is delayed when the encoded media content in the streams is encrypted and the playback device must first negotiate for and receive a decryption key to decode the media content. The delay in the start-up may be on the order of several seconds which is unsatisfactory to a user. To reduce the time needed for start-up, source media is encoded as at least one video stream for normal playback and at least one stream that can be utilized to perform quick start-up for playback of the encoded media in some embodiments of this invention. In order to further reduce the start-up time in some other embodiments, the source media is encoded as a number of alternative streams for adaptive bitrate streaming and at least one additional quick start-up stream. In the quick start-up stream, the source media is encoded in such a way that playback of encoded media from the quick start-up starts faster than playback of the encoded media from the conventional alternative streams. To do so, the quick start-up stream includes a lower quality version of the encoded media in accordance some embodiments. For purposes of this discussion, lower quality means that the encoded media has a lower resolution, bitrate, and/or frame rate than encoded media in another stream. In some other embodiments, the quick start-up stream may include a lower quality version of the encoded media that is encrypted in a different manner than the other alternative streams such that the time to obtain decryption information for the quick start-up stream is less than that of the encryption method used for the other alternative streams. In accordance with a number of these embodiments, the quick start-up stream may not be encrypted in any way. In accordance with some others of these embodiments, the quick start-up stream is encrypted using an encryption process that has a decryption key stored in the playback device and is accessible to the application performing the playback to allow decryption of the media content to commence immediately after the content is received from the quick start-up stream. The quick start-up stream can be utilized to fill the buffer of the playback device with the media content more quickly than the use of one of the conventional alternative stream to allow quicker start-up of playback. In several embodiments, the process of loading the quick start-up stream can involve instantiating a first decoder to decode the start-up stream and tearing down the first decoder and instantiating a second decoder to decode a higher resolution and/or more robustly encrypted stream that is buffered during playback of content by the first decoder.

In accordance with some embodiments, the media content is stored in streams in accordance with the DASH standards. However, one skilled in the art will recognize that the formats such as but not limited to, a Matroska (MKV) container file format may used to store streams of the media content without departing from this invention.

The performance of an adaptive bitrate streaming system in accordance with some embodiments of the invention can be significantly enhanced by encoding each portion of the source video in each of the alternative streams and the quick start-up stream at each bit rate in such a way that the portion of video is encoded in each stream as a single (or at least one) closed group of pictures (GOP) starting with an Instantaneous Decoder Refresh (IDR) frame, which is an intra frame. In many embodiments, the media content in the quick start-up stream is also encoded at a lower bitrate, frame rate and/or resolution than the video content in the other alternative streams to have a lower quality than the media content encoded in the other alternative streams. The playback device can switch between the alternative streams used during normal playback and the quick start-up stream at the completion of the playback of a segment and, irrespective of the stream from which a segment is obtained, the first frame in the segment will be an IDR frame that can be decoded without reference to any encoded media other than the encoded media contained within the Cluster element. Thus, a playback device may switch from receiving media content from the quick start-up stream and perform conventional adaptive bitrate streaming as if the quick start-up stream was any other available stream.

In a number of embodiments, the MPD may contain a decryption key that can be used to decrypt encoded media content in the quick start-up stream or a URL where the decryption key may be obtained. The playback device obtains information concerning each of the available streams from the MPD and selects one or more streams to utilize in the playback of the media. The playback device can then obtain header information from the container files containing the one or more bitstreams or streams, and the headers provide information concerning the decoding of the streams. The playback device can also request index information that indexes segments of the encoded media stored within the relevant container files. The index information can be stored within the container files or separately from the container files in the MPD or in separate index files. The index information enables the playback device to request byte ranges corresponding to segments of the media within the container file containing specific portions of encoded media via HTTP from the server. The playback device uses the index information to request portions of the media content from the quick start-up stream during start-up and then to request portions of the encoded media from the other alternative streams after start-up has completed in accordance with some embodiments. Playback is continued with the playback device requesting portions of the encoded content from a stream having media content that is encoded at a bitrate that can be supported by the network conditions.

The encoding of source video for use in adaptive bitrate streaming systems that provide a quick start-up stream and the playback of the encoded media content using adaptive bit rate streaming in accordance with some embodiments of the invention is discussed further below.

Adaptive Streaming System Architecture

Figure 1:
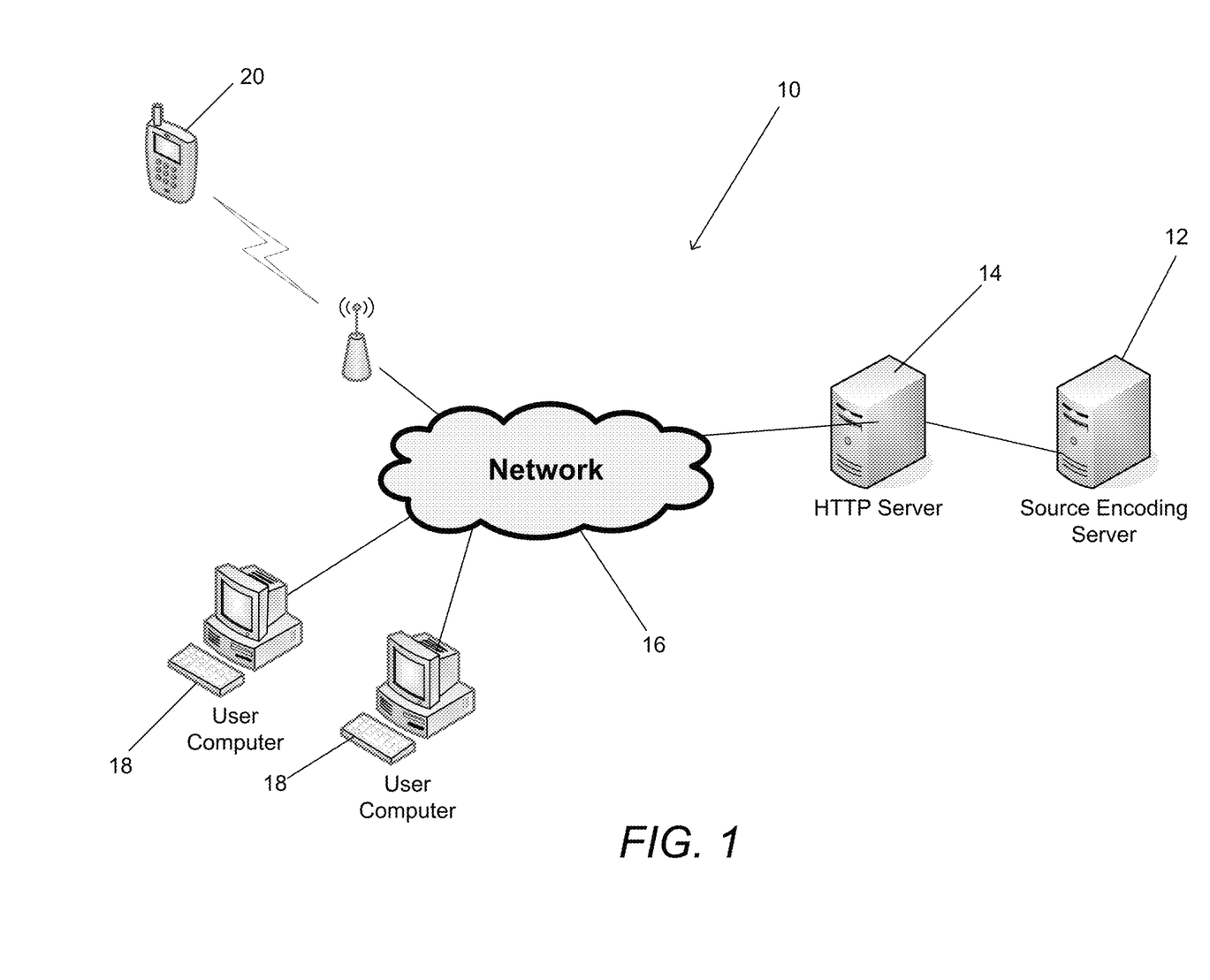
FIG. 1 illustrates a network diagram of an adaptive bitrate streaming system in accordance with an embodiment of the invention.

Turning now to the FIG. 1, an adaptive streaming system in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

Playback Device

Figure 2:
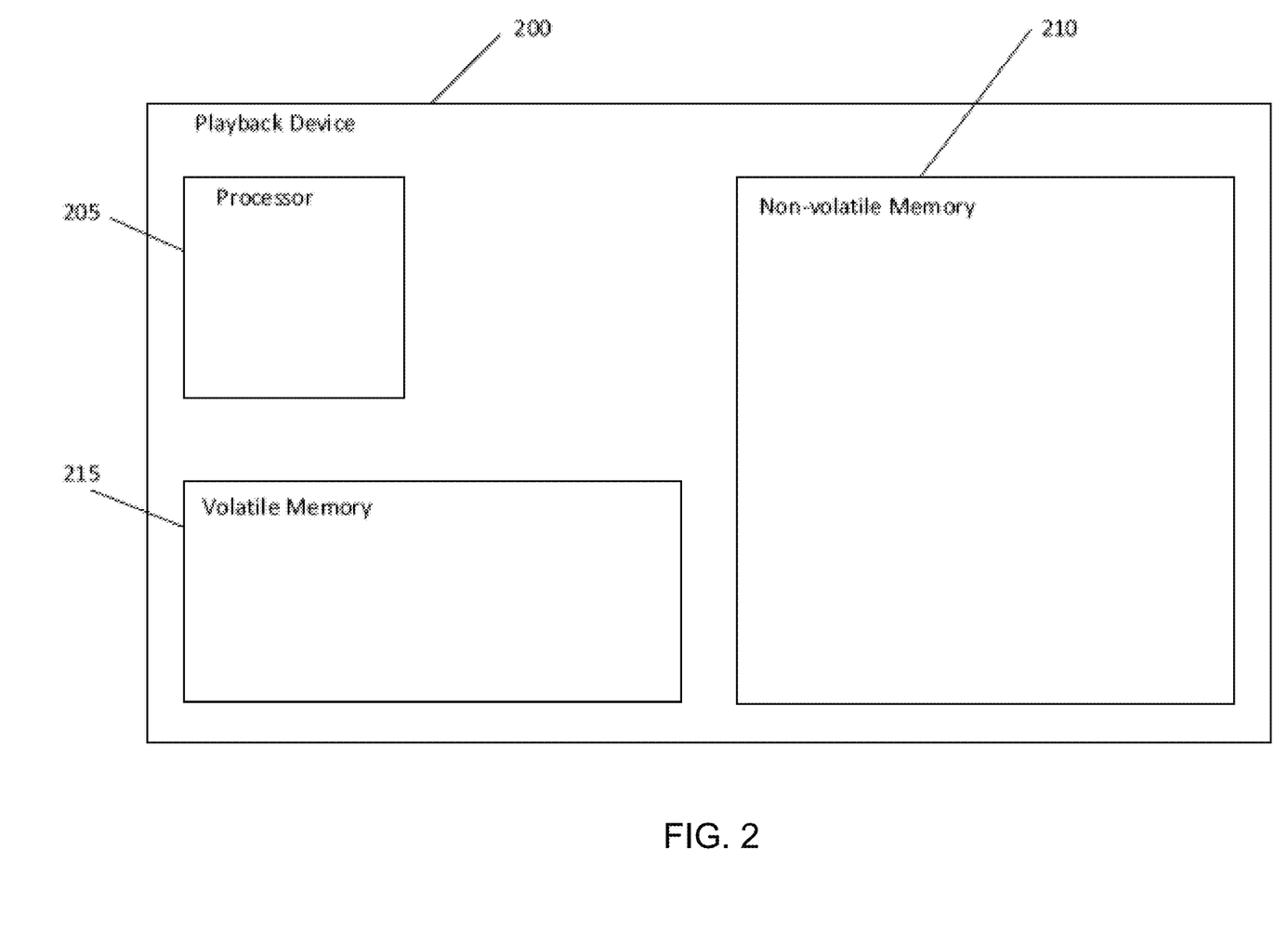
FIG. 2 illustrates a block diagram of components of a processing system such as a processing system in a playback device in accordance with an embodiment of the invention.

Some processes for providing methods and systems in accordance with embodiments of this invention are executed by a playback device. The relevant components in a playback device that can perform processes including adaptive streaming processes in accordance with embodiments of the invention are shown in FIG. 2. One skilled in the art will recognize that playback device may include other components that are omitted for brevity without departing from described embodiments of this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In other embodiments, the playback device software and/or firmware can be stored in any of a variety of non-transitory computer readable media appropriate to a specific application.

Servers

Figure 3:
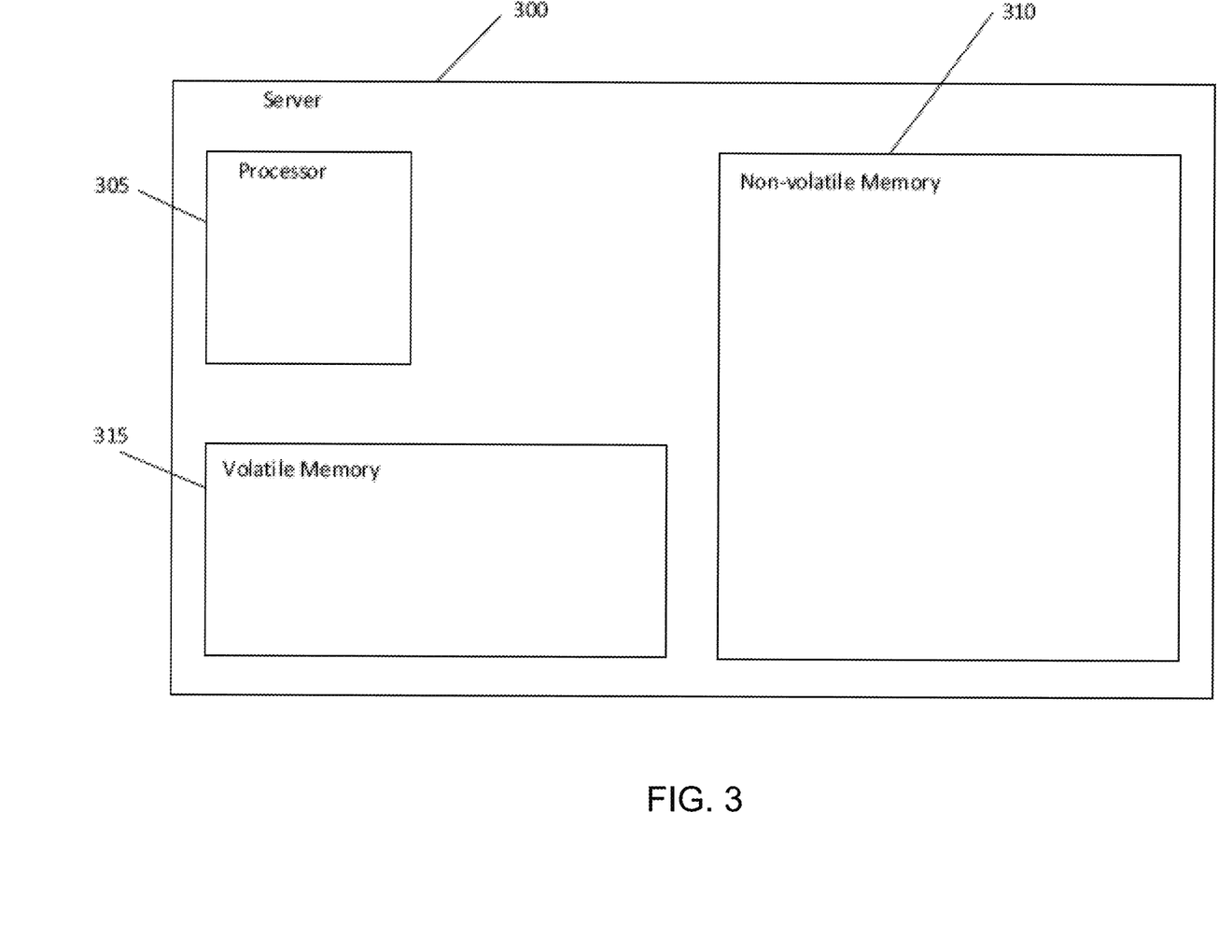
FIG. 3 illustrates a block diagram of components of a processing system such as a processing system in an encoding system, and/or a content provider system in accordance with an embodiment of the invention

Some processes for providing methods and systems in accordance with embodiments of this invention are executed by the HTTP server; source encoding server; and/or local and network time servers. The relevant components in a server that perform the processes in accordance with embodiments of the invention are shown in FIG. 3. One skilled in the art will recognize that a server may include other components that are omitted for brevity without departing from the described embodiments of this invention. The server 300 includes a processor 305, a non-volatile memory 310, and a volatile memory 315. The processor 305 is a processor, microprocessor, controller, or a combination of processors, microprocessor, and/or controllers that performs instructions stored in the volatile 315 or non-volatile memory 310 to manipulate data stored in the memory. The non-volatile memory 310 can store the processor instructions utilized to configure the server 300 to perform processes including processes in accordance with embodiments of the invention and/or data for the processes being utilized. In other embodiments, the server software and/or firmware can be stored in any of a variety of non-transitory computer readable media appropriate to a specific application. Although a specific server is illustrated in FIG. 3, any of a variety of servers configured to perform any number of processes can be utilized in accordance with embodiments of the invention.

Encoding of Quick Start-Up Stream and Alternative Streams

Figure 4:
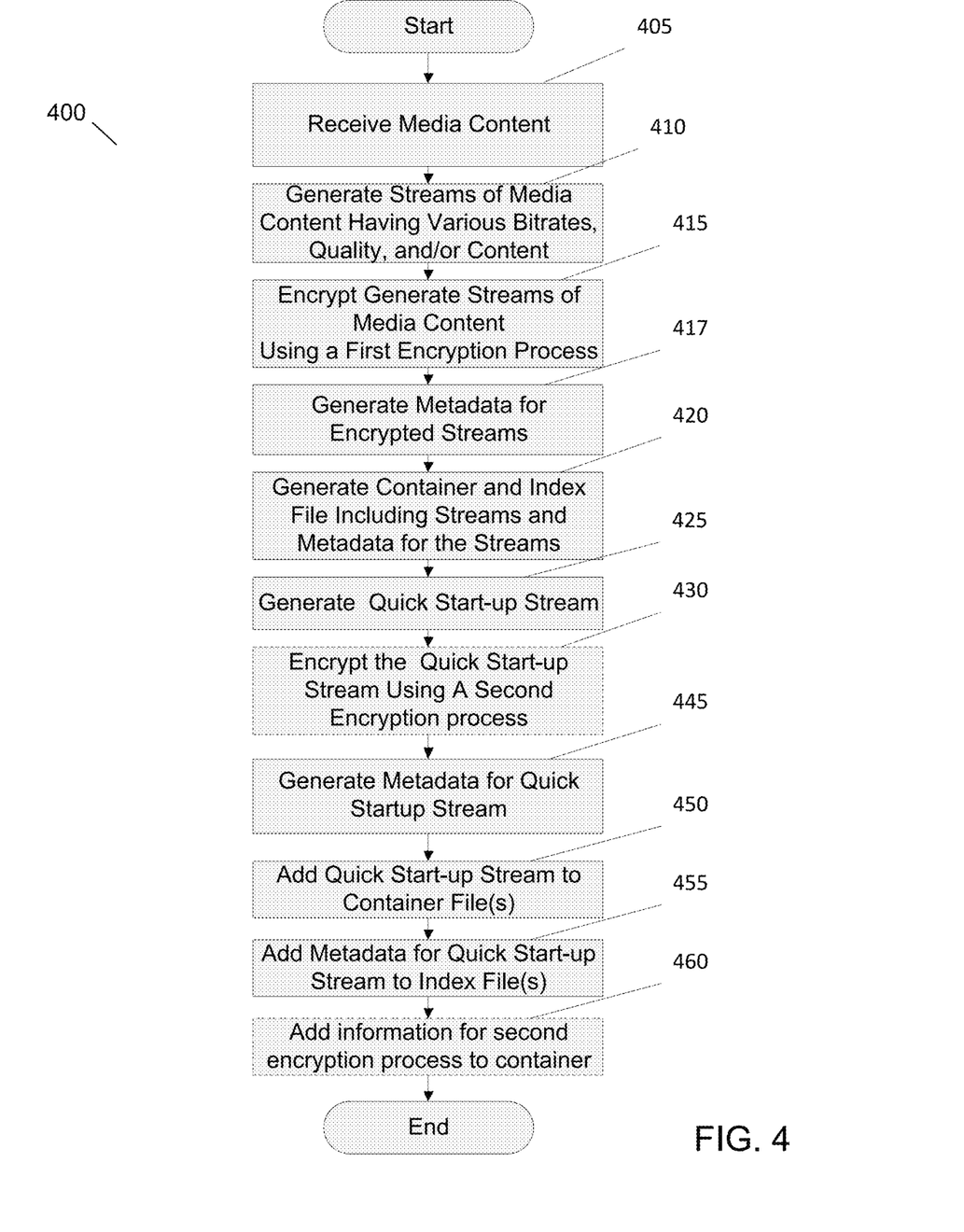
FIG. 4 illustrates a flow diagram of a process performed by an encoding system to encode streams including encrypted data of the media content in accordance with embodiments of the invention.

A flow diagram of a process for encoding source media content into alternative streams including a quick start-up stream performed by an encoding system in accordance with an embodiment of the invention is shown in FIG. 4. Process 400 includes receiving source media content (405). In accordance with some embodiments, the source media content may include a source media content having a particular resolution, frame rate, and other conventional properties. In accordance with other embodiments, the source media content may include multiple copies of a particular source media content where each copy of the source media content in a set of copies has a different resolution, frame rate and/or other properties to allow the generation of streams that have different properties for use by playback devices that support different media content characteristics.

The encoding system encodes the media content into alternative streams of content (410). In accordance with various embodiments, the alternative streams include one or more streams of the encoded video content. In accordance with some embodiments, the generated alternative streams have varying bitrates, level of quality, and/or content. For example, each alternative stream may have a different bit rate such that each stream can be used when network conditions can support the stream, such as (but not limited to) when network bandwidth exceeds a required bit rate for the stream. Furthermore, different alternative streams may include media content having different aspect ratios, resolutions, and/or frame rates to support different types of playback devices and/or the different bitrates of the streams in accordance with many embodiments.

The generated media content of the streams is encrypted using a first encryption process (415). The encryption of the stream prevents unauthorized users from viewing the media content. In accordance with some embodiments, the first encryption process uses a first key that is more secure than the key used to encrypt the quick start-up stream as discussed further below. One skilled in the art will recognize that any encryption method may be used without departing from the invention. A particular encryption process used in accordance with a number of embodiments of this invention is described in U.S. Pat. No. 8,909,922 entitled "Systems and methods for playing back alternative streams of protected content protected using common cryptographic information" issued to Kiefer et al. on Dec. 9, 2014 the portions relating to the adaptive bit rate streaming of encrypted material is hereby incorporated by reference.

Metadata for each of the alternative streams that includes the information discussed above with reference to container files is generated (417). In accordance with some embodiments, the metadata may include the information relating to properties of the stream included the encoded maximum bitrate of the stream and presentation time information of each chunk; properties of the media content including, but not limited to, resolution, frame rate, and sample aspect ratio. The container file(s) and index file(s) for the alternative streams is generated from the encrypted alternative streams and metadata for the encrypted streams. In accordance with some embodiments, the index files may include a top level index file that includes metadata for each stream and a pointer or URL for each of the alternative streams for use in adaptive bitrate streaming.

One skilled in the art will recognize that although the generating of the streams (410), encrypting of the streams (415), generating of metadata (417), and generation of the container file(s) (420) are shown as separate processes, the processes may be done simultaneously or in different sequences in accordance with some embodiments.

In addition, a quick start-up stream of the media content is generated (425). In accordance with some embodiments, the quick start-up stream includes a low quality version of the media content. In accordance with many of the embodiments, the low quality stream may include only a small portion of the media content, such as the beginning portion of the media content. For example, the quick start-up streams may include only a portion on the order of several seconds to minutes of the beginning portion of the media content to only allow the quick start-up and the beginning of the streaming. Optionally, the encoding system may encrypt the quick start-up data using a second encryption process (430). In accordance with a number of embodiments, the second encryption process is less secure than the first encryption process used for the other alternative streams. For example, the second encryption process may use a simple encryption/decryption key that may be less complex than the encryption/decryption key used in the first encryption process. The metadata for the quick start-up steam is generated (445). In accordance with some other embodiments, the encryption/decryption keys for the second encoding process is stored in the playback device and is available to the application playback the media. In accordance with many embodiments, the metadata generated for the quick start-up streams is the same as or similar to the metadata generated for the alternative streams as described above.

The encoding system then adds the quick start-up stream to a container file and/or generates a container file for the quick start-up stream using the generated stream and/or the generated metadata (450). The container file for the quick start-up stream is the same and/or similar to the container file(s) generated for the alternative streams described above. The metadata for the quick start-up file is also added to the index file(s) for the streams (455). In accordance with some embodiments, the adding of the metadata of the quick start-up stream to the index file(s) includes metadata for the quick start-up stream to a top index file.

The encoding system may also add encryption information for the second encryption process to the index files (460). In accordance with some embodiments, the adding of the encryption information may include adding a decryption key for the second encryption process to an index file that includes the metadata for the quick start-up stream. In accordance with some other embodiments, the adding of the encryption information may include an identifier or a URL for a file containing the decryption key for the second encryption process.

One skilled in the art will recognize that although the generating of the streams (425), encrypting of the streams (430), generating of metadata (445), and generation of the container file (450) are shown as separate processes, the processes may be done simultaneously in accordance with some embodiments. Furthermore, One skilled in the art will recognize that although the generating of the streams (410), encrypting of the streams (415), generating of metadata (417), and generation of the container file(s) (420) are shown as separate from the corresponding process described above for the generating the alternative streams, the processes for the quick start-up stream and alternative streams may be performed simultaneously in accordance with some embodiments.

Although various processes for encoding alternative streams with a quick start-up stream are described above, one skilled in the art will recognize that other processes for encoding streams including a quick start-up stream may be performed in accordance with some embodiments of the invention.

Figure 5:
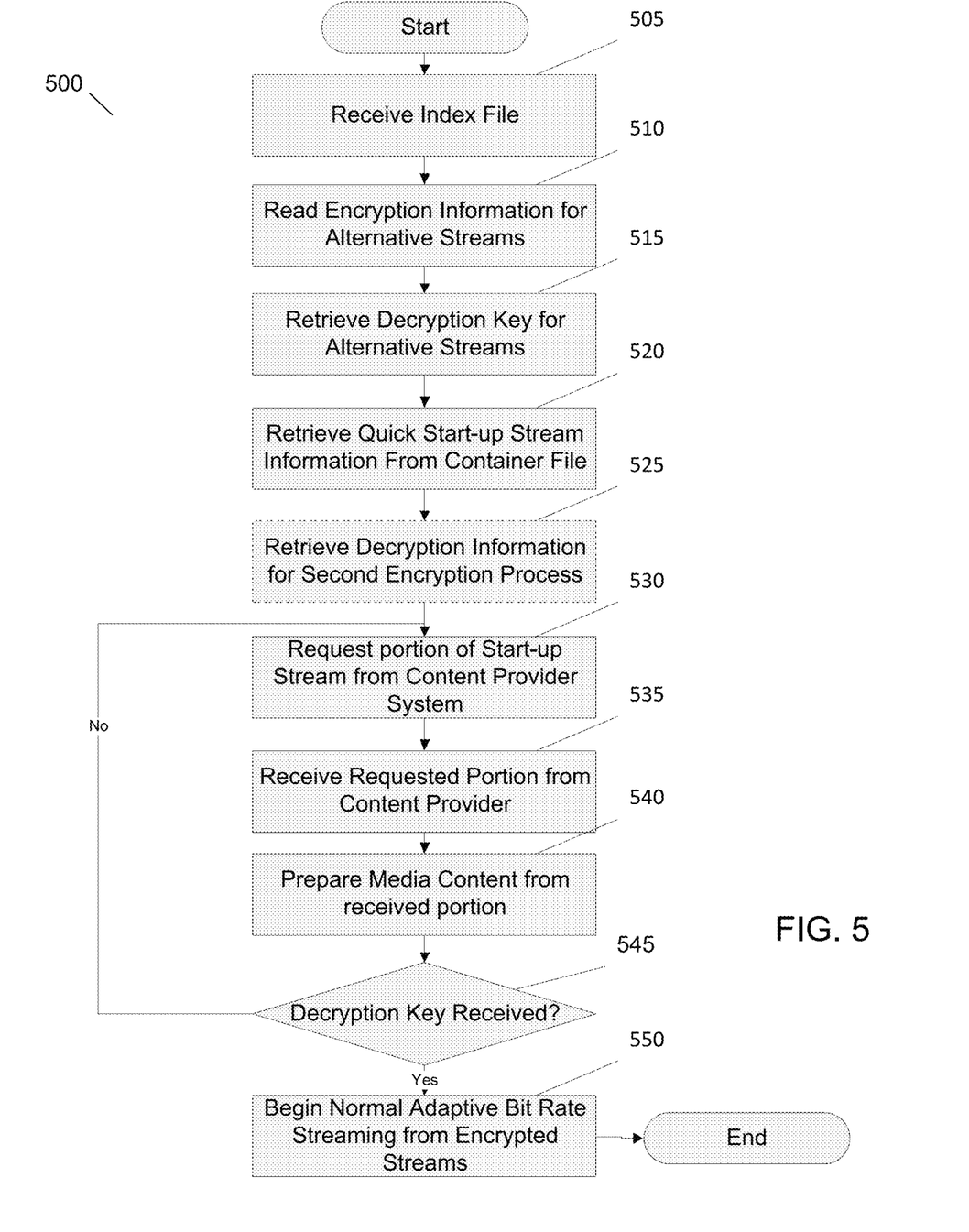
FIG. 5 illustrates a flow diagram of a process performed by a playback device using a start-up stream to begin playback of media content in accordance with an embodiment of the invention.

The quick start-up stream may be used by a playback device to more quickly load, decode, and start playback of media content while the playback device is preparing to decode the media content from the other alternative streams. In some embodiments, the quick start-up stream may be used to playback a beginning portion of the media content while the playback device completes the process of obtaining a decryption key for decrypting and decoding the media content in the other alternative streams. In many embodiments, the quick start-up stream may also be used to obtain media content to fill the buffer the playback device after a trick play command is performed. A process performed by a playback device to begin playback using a quick start-up stream in accordance with an embodiment of the invention is shown in FIG. 5.

In process 500, the playback device begins by receiving a top level index file for the media content (505). The playback device obtains the decryption/encryption information for the alternative streams of the media content (510). In accordance with some embodiments, the decryption/encryption information is read from the top level index file. In accordance with other embodiments, the encryption/decryption information is received from another source. The decryption/encryption information may be an identifier such as a URL or other type of pointer that directs the playback device to an authentication process provided by an authentication system and/or the content provider system. Based upon the decryption/encryption information, the playback device performs a process to obtain a decryption key (515).

The playback device also retrieves the quick start-up stream information from the top level index file (520). In accordance with some embodiments, the quick start-up stream is a URL to a container file containing the encoded video data of the quick start-up stream and/or the index file for the quick start-up stream. In many embodiments, the playback device may also obtain a decryption key or other decryption information from the top level index file, the index file of the quick start-up stream, and/or a decryption file in the container file of the quick start-up stream (525).

The playback device then begins streaming from the quick start-up stream container file. To do so, the playback device requests a portion of the media content (i.e. encoded audio, subtitles, and/or video data) of the quick start-up stream from the quick start-up stream container file (530). In accordance with some embodiments, the playback device begins by request the first portion of the quick start-up stream container file. In a number of embodiments, the playback device begins requesting portions of the quick start-up stream container file at a desired point within the stream such as, but not limited to, a current presentation point in media content after a trick play command has been performed. The playback device receives the requested portion from the container filer on a content provider system (535) and prepares the media content for play back (540). The preparation of the media content for playback may include decrypting the received portion and decoding the media content from the decrypted portion in accordance with many embodiments.

The playback device determines whether the decryption key for the other alternative streams has been received (545). In accordance with some embodiments, another metric may be used instead of or in combination with the reception of the decryption key such as, but not limited to, a specified amount of media content has been received or a predetermined amount of time has elapsed. If the decryption key has not been received and/or another metric has not been met, the playback device repeats the requesting (530), reception (535), and preparation (540) for playback of another portion of the quick start-up stream. If the decryption key has been received and/or another metric has been met, the playback device begins perform streaming with the other alternative streams in a conventional manner (550). Systems and methods for selecting a stream and commencing playback include those disclosed in U.S. Patent Application Publication 2013/0007200 entitled "Systems and Methods for Determining Available Bandwidth and Performing Initial Stream Selection When Commencing Streaming Using Hypertext Transfer Protocol" and U.S. Pat. No. 8,832,297 entitled "Systems and Methods for Performing Multiphase Adaptive Bitrate Streaming," the disclosures of which are hereby incorporated by reference in their entirety more particularly the processes performed by a playback device to obtain media content using adaptive bit rate streaming are incorporated herein by reference.

Although specific processes for starting playback using a quick start-up stream is discussed above with reference to FIG. 5, one skilled in the art will recognize that other processes for starting playback with a quick start-up stream may be performed in accordance with various embodiments of this invention.

Figure 6:
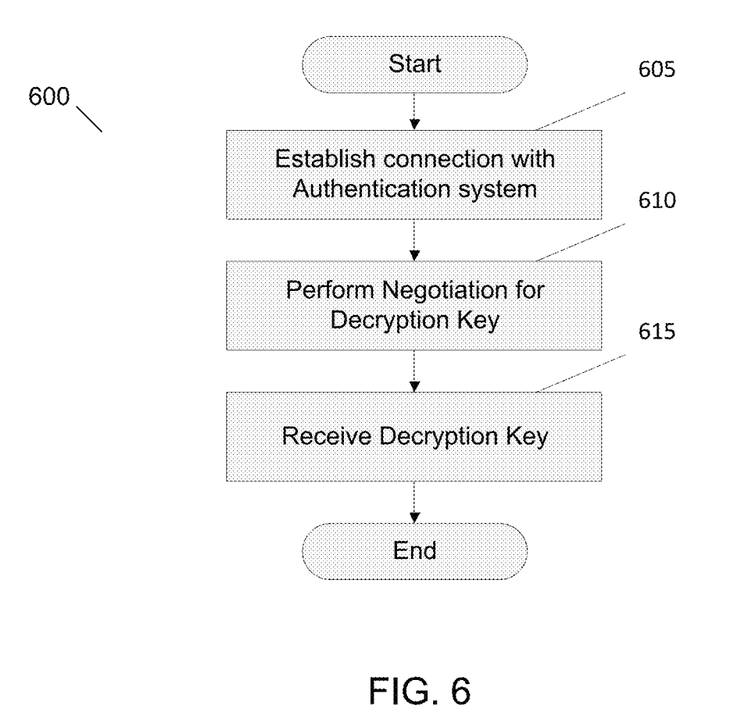
FIG. 6 illustrates a flow diagram of a process performed by a playback device to obtain an encryption key in accordance with an embodiment of the invention.

In order to obtain the decryption key for the alternative streams a playback device must negotiate for the key with the content provider system and/or a third party authentication system. A process performed by a playback device in accordance with an embodiment of this invention is shown in FIG. 6. Process 600 includes establishing connection with an authentication system (605). In accordance with some embodiments, the established connection is a secure connection over the network to assure confidential information cannot be obtained by third parties. The playback device then interacts with the authentication system to negotiate for the decryption key (610). In accordance with many embodiments, the negotiation may include the playback device providing certified and/or registration information to the authentication system and the authentication system verifying the information to authorize the playback device. Once the playback device is authorized, the authentication system provides the decryption key to playback device that receives the decryption key over the secure connection (615).

Although specific processes for obtaining a decryption key in accordance with an embodiment of the invention is disclosed in FIG. 6, other processes may be performed by a playback device to obtain a decryption key in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A method for encoding for fast startup of video playback of encoded media content using at least two video streams, where the media is encoded as at least a first video stream and a second video stream, the method comprising:
    encoding media content as a plurality of alternative streams, where the plurality of alternative media streams are encoded at various bitrates, resolutions, and frame rates, and the media content in each particular stream of the plurality of encrypted alternative streams has a particular quality based upon at least one of the bitrate, resolution of, and frame rate of the particular stream;
    encrypting each alternative stream of the plurality of alternative streams with a common set of cryptographic information;
    storing each alternative stream of the plurality of alternative streams in a set of one or more alternative stream containers;
    generating a quick start-up stream of the media content, wherein the quality of media content in the quick start-up stream has a lesser quality than the video content of each of the plurality of encrypted alternative streams;
    storing the quick start-up stream in a quick start-up container; and
    providing the common set of cryptographic information to an authentication system over the network.

2. The method of claim 1 further comprising encrypting the quick start-up stream of the media content using a second encryption process, wherein at least one stream of the plurality of encrypted alternative streams is encrypted using a first encryption process and the quick start-up stream is encrypted using a second encryption process that is less secure than the first encryption process.

3. The method of claim 2, wherein the second encryption process uses a second set of cryptographic information, wherein the second set of cryptographic information is stored in the quick start-up container.

4. The method of claim 1, wherein the quick start-up stream is unencrypted.

5. The method of claim 1, wherein the common set of cryptographic information comprises a set of one or more keys.

6. The method of claim 1 further comprising storing a top level index pointing to each alternative stream container of the set of alternative stream containers.

7. The method of claim 6, wherein the top level index further comprises information about the quick start-up stream.

8. An encoder device comprising:
    a memory;
    a network interface; and
    a processor that reads instructions stored in the memory that direct the processor to:
        encode media content as a plurality of alternative streams, where the plurality of alternative media streams are encoded at various bitrates, resolutions, and frame rates, and the media content in each particular stream of the plurality of encrypted alternative streams has a particular quality based upon at least one of the bitrate, resolution of, and frame rate of the particular stream;
        encrypt each alternative stream of the plurality of alternative streams with a common set of cryptographic information;
        store each alternative stream of the plurality of alternative streams in a set of one or more alternative stream containers;
        generate a quick start-up stream of the media content, wherein the quality of media content in the quick start-up stream has a lesser quality than the video content of each of the plurality of encrypted alternative streams;
        store the quick start-up stream in a quick start-up container; and
        provide the common set of cryptographic information to an authentication system over the network.

9. The encoder device of claim 8, wherein the processor is further directed to encrypt the quick start-up stream of the media content using a second encryption process, wherein at least one stream of the plurality of encrypted alternative streams is encrypted using a first encryption process and the quick start-up stream is encrypted using a second encryption process that is less secure than the first encryption process.

10. The encoder device of claim 9, wherein the second encryption process uses a second set of cryptographic information, wherein the second set of cryptographic information is stored in the quick start-up container.

11. The encoder device of claim 8, wherein the quick start-up stream is unencrypted.

12. The encoder device of claim 8, wherein the common set of cryptographic information comprises a set of one or more keys.

13. The encoder device of claim 8, wherein the processor is further directed to store a top level index pointing to each alternative stream container of the set of alternative stream containers.

14. The encoder device of claim 13, wherein the top level index further comprises information about the quick start-up stream.

15. A non-transitory machine readable medium containing processor instructions, where execution of the instructions by a processor causes the processor to perform a process comprising:
    encoding media content as a plurality of alternative streams, where the plurality of alternative media streams are encoded at various bitrates, resolutions, and frame rates, and the media content in each particular stream of the plurality of encrypted alternative streams has a particular quality based upon at least one of the bitrate, resolution of, and frame rate of the particular stream;
    encrypting each alternative stream of the plurality of alternative streams with a common set of cryptographic information;

storing each alternative stream of the plurality of alternative streams in a set of one or more alternative stream containers;

generating a quick start-up stream of the media content, wherein the quality of media content in the quick start-up stream has a lesser quality than the video content of each of the plurality of encrypted alternative streams;

storing the quick start-up stream in a quick start-up container; and providing the common set of cryptographic information to an authentication system over the network.

16. The non-transitory machine readable medium of claim 15 further comprising encrypting the quick start-up stream of the media content using a second encryption process, wherein at least one stream of the plurality of encrypted alternative streams is encrypted using a first encryption process and the quick start-up stream is encrypted using a second encryption process that is less secure than the first encryption process.

17. The non-transitory machine readable medium of claim 16, wherein the second encryption process uses a second set of cryptographic information, wherein the second set of cryptographic information is stored in the quick start-up container.

18. The non-transitory machine readable medium of claim 15, wherein the quick start-up stream is unencrypted.

19. The non-transitory machine readable medium of claim 15, wherein the common set of cryptographic information comprises a set of one or more keys.

20. The non-transitory machine readable medium of claim 15, wherein the process further comprises storing a top level index pointing to each alternative stream container of the set of alternative stream containers, wherein the top level index further comprises information about the quick start-up stream.

* * * * *